Figure 1:
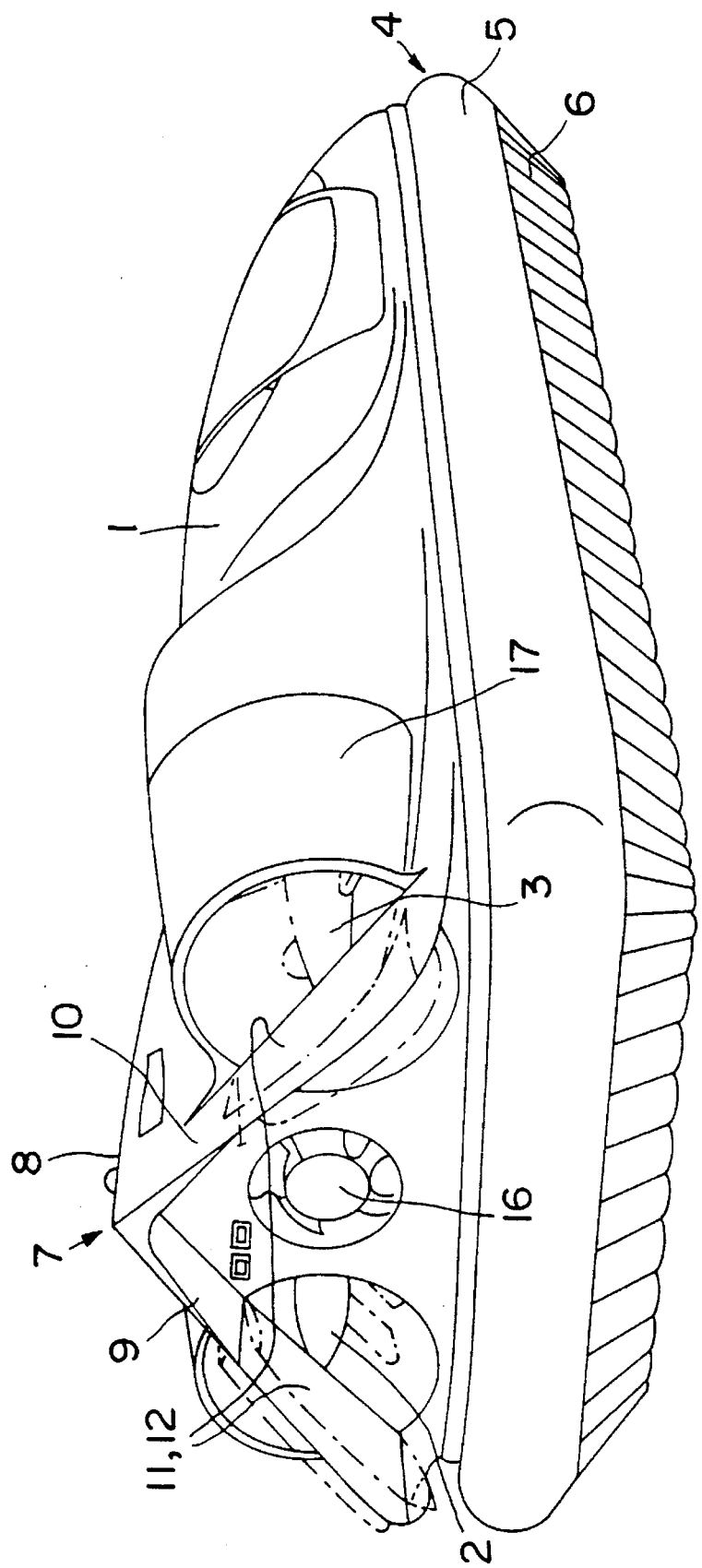

United States Patent [19]
Stiegler et al.

[11] Patent Number: 5,520,260
[45] Date of Patent: May 28, 1996

[54] STEERING GEAR FOR A HOVERCRAFT

[76] Inventors: Hartmut Stiegler, Krefelder Strasse 840, 41066 Mönchengladbach, Germany; Albert Blum, 3, chemin des Chènes, CH-2072 St. Blaise, Switzerland

[21] Appl. No.: 347,390
[22] PCT Filed: Jun. 16, 1993
[86] PCT No.: PCT/DE93/00529
  § 371 Date: Dec. 16, 1994
  § 102(e) Date: Dec. 16, 1994
[87] PCT Pub. No.: WO93/25422
  PCT Pub. Date: Dec. 23, 1993

[30] Foreign Application Priority Data
  Jun. 17, 1992 [DE] Germany ............ 42 19 826.7
[51] Int. Cl.⁶ ........................................ B60V 1/11
[52] U.S. Cl. ............................................ 180/117
[58] Field of Search .................. 180/117, 120, 180/121, 122, 116

[56] References Cited
U.S. PATENT DOCUMENTS
3,262,510  7/1966  Froehler ................. 180/117
4,151,893  5/1979  Mantle .................... 180/116
4,249,628  2/1981  Longley .................. 180/117
5,096,012  3/1992  Chia et al. .............. 180/117

FOREIGN PATENT DOCUMENTS
1-83450   3/1989  Japan .................... 180/116
3-178857  8/1991  Japan .................... 180/117

*Primary Examiner*—Kevin T. Hurley
*Attorney, Agent, or Firm*—Brooks & Kushman

[57] ABSTRACT

A steering device for a hovercraft having two driving engines (2, 3), a back skirt (5), a finger skirt (6) and a jet deflection device located downstream of the two driving engines (2, 3). The jet deflection device includes a negative Vee stream deflector (7) and rudder elements (11, 12) which can be operated in opposite directions. The Vee stream deflector (7) is arranged behind the driving engines (2, 3) in such a way that each driving engine (2, 3) is assigned a portion of the Vee stream deflector (7) having the rudder element (11; 12). The rudder elements (11; 12) run diagonally through an axis of symmetry of the respective driving engine (2, 3). The Vee stream deflector (7) further includes a middle section which acts as a stabilizing nose (8).

7 Claims, 2 Drawing Sheets

STEERING GEAR FOR A HOVERCRAFT

The invention relates to a steering device for a hovercraft having at least one engine to drive it and a compressor to provide an air-cushion which can be generated below the craft, and in which there is a rudder device at the stern to control the direction of travel.

Hovercraft are generally fitted with a compressor to generate the necessary air-cushion within a rubber skirt and at least one drive engine for taking straight and/or curve courses. When a curve course is taken, the hovercraft is usually steered by laterally deflecting the jet of air emerging from the engine. Lateral rudders familiar from aircraft construction and arranged directly in the jet of air are generally used for this lateral deflection of the jet of air. An alternative possibility for controlling the direction of travel of the hovercraft is to laterally deflect the jet of air by swivelling the exhaust diffusor or the entire engine.

In this context, however, a more or less pronounced lateral drift in the direction of the outside of the curve occurs as a function of the speed travelled, with the result that steering becomes difficult during such manoeuvres on account of the large radii of curvature required. Furthermore, when taking a curve course, the hovercraft tilts about the transverse axis of stability in the direction of the outside of the curve due to the centrifugal force acting on the centre of gravity. Thus, a larger air gap forms between the rubber skirt and the ground or the surface of the water on the inside of the curve, with the result that additional air is expelled on this side. An additional force component is produced in this manner, on top of the centrifugal force, which causes an increase in the drift. The result is an increase in the necessary radii of curvature in all speed ranges.

The effect of the hovercraft tilting about the transverse axis of stability in the direction of the outside of the curve arises regardless of the manner in which the craft is steered in the curve course.

A similar effect is also produced by side-winds, which cause the hovercraft to tilt leewards about the transverse axis, this resulting in increased drift.

The aim of the invention is therefore to provide a steering device for a hovercraft providing a substantial improvement in taking a curve course and a considerable reduction in the radii of curvature in all speed ranges.

The invention relates to a steering device for a hovercraft having at least one engine to drive it and an engine to provide an air-cushion which can be generated below the craft, and in which there is a rudder device at the stern to control the direction of travel.

The underlying task of the invention is solved by providing the engines with a jet deflection device, with which the jet of air emerging from the engines can be deflected when a curve course is taken, in such a way as to produce a force component about the transverse axis of stability which counteracts the centrifugal force.

As a result of producing a force component which acts above the centre of gravity and counteracts the centrifugal force when taking a curve course, the hovercraft tilts towards the inside of the curve taken.

This inclination towards the inside of the curve causes a reduction in size of the air gap between the bottom edge of the rubber skirt and the ground or the surface of the water on this side, and an increase on the outside of the curve. An additional force component is thus produced in the direction of the inside of the curve, which reduces the drift of the hovercraft and, at the same time, markedly improves manoeuvrability at slow speeds. The reduction in drift simultaneously reduces the radii of curvature which can be achieved.

In an improved version of the invention, two engines are arranged next to each other at the stern of the hovercraft, each engine being provided with a downstream jet deflection device. This arrangement leads to markedly better control of the inclination of the hovercraft when taking a curve course.

The air jet is then deflected in such a way that the air jet of the engine on the inside of the curve is deflected in the same direction as the curve and upwards at the same time, or the air jet of the engine on the outside of the curve is deflected in the same direction as the intended curve and downwards at the same time. This deflection of the air jet achieves the necessary inclination of the hovercraft about the transverse axis in the direction of the inside of the curve.

Another improved version of the invention is characterised in that the air jet of the engine on the inside of the curve can be deflected in the same direction as the intended curve and upwards at the same time and/or the air jet of the engine on the outside of the curve can be deflected in the same direction as the intended curve and downwards at the same time. Because the air jets of both engines are deflected simultaneously in the manner described, manoeuvrability is markedly improved, particularly at slow speeds.

In a further version of the invention, a rudder system with a negative Vee arrangement in the form of a Vee stream deflector is provided behind the engines and fitted in such a way that a limb provided with a rudder element is located behind each engine so that the rudder elements extend across the entire diameter of the engines.

The rudder elements can be operated in opposite directions to one another, allowing deflection of the air jet of each engine in the direction of the curve and, at the same time, downwards on the outside of the curve and upwards on the inside of the curve.

In order to achieve an optimum rudder effect, the Vee stream deflector is fitted directly to the engine exhaust diffusors, with the rudder elements of the Vee stream deflector running diagonally through the axis of symmetry of the respective engine.

In another version of the invention, at least the roof edge-shaped middle section of the Vee stream deflector protrudes beyond the contour of the hovercraft, being designed as a stabilising nose at the same time. This yields a marked improvement in directional stability at higher speeds.

Furthermore, the bottom edges of the Vee stream deflector blend into the side of the hovercraft in arch form, thus reducing flow losses caused by the formation of vortices.

The underlying task of the invention is also solved by a hovercraft which is characterised in that two engines provided for forward drive are mounted next to each other, and protruding laterally, on the top side of the bodywork, that the Vee stream deflector is fitted behind the engines on their exhaust diffusors in a negative Vee arrangement, that each engine is provided with a rudder which runs through the axis of symmetry of the respective engine, that the rudders can be operated in opposite directions to one another, that the Vee stream deflector protrudes beyond and behind the bodywork of the hovercraft and that a fan is located beneath the Vee stream deflector between the engines in order to cool a motor.

Figure 2:
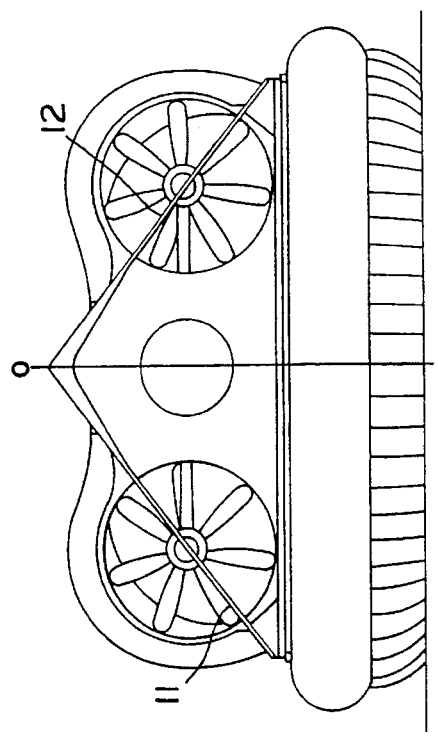
Figure 4:
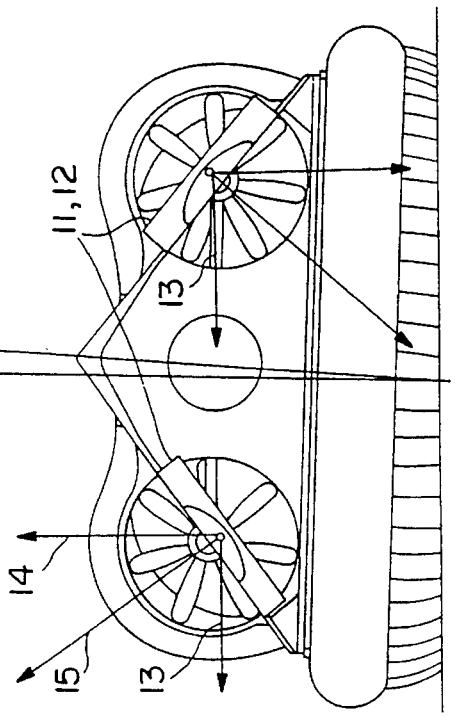
Figure 3:
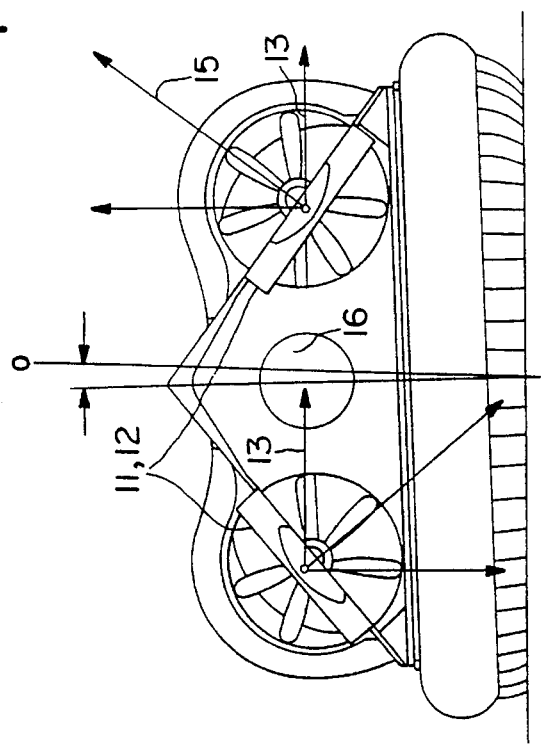

The invention is described in more detail below on the basis of a practical example. The associated drawings show the following:

FIG. 1 A perspective rear view of a hovercraft provided with a negative Vee stream deflector according to the invention;

FIG. 2 The rear view as per FIG. 1, with the rudder elements in neutral position for taking a straight course;

FIG. 3 The position of the rudder elements when taking a left-hand curve course, and FIG. 4 The position of the rudder elements when taking a right-hand curve course.

According to FIG. 1, two laterally arranged drawing engines 2, 3 are provided at the stern of the bodywork 1 of a hovercraft in order to generate forward motion. A peripheral rubber skirt 4 is fitted to the bottom of the bodywork 1, comprising a back skirt 5 and a finger skirt 6. A negative Vee stream deflector 7 is located behind the drawing engines 2, 3, the upper middle section of which is designed as a stabilising nose 8 protruding beyond the contour of the bodywork 1. In this context, the deflector 7 is designed in such a way that the two downwardly directed deflector surfaces 9, 10 extend centrally across the drawing engines 2, 3. Furthermore, the deflector surfaces 9, 10 are provided with rudder elements 11, 12 extending across the entire diameter of the drawing engines 2, 3, with the rudder elements 11, 12 being operable in opposite directions to each other.

In order to achieve particularly favourable flow conditions, the Vee stream deflector 7 is fitted directly to the exhaust diffusors 17 of the drawing engines 2, 3. In this context, the rudder elements run diagonally through the axis of symmetry of the respective drawing engine 2, 3. Furthermore, the Vee stream deflector 7 possesses a roof edge-shaped middle section, designed as a stabilising nose 8 and rising continuously in the direction of the stern of the hovercraft. This stabilising nose 8 causes a marked improvement in directional stability when taking straight courses and at higher speeds.

In order to avoid flow losses causes by the formation of vortices, the bottom edges of the Vee stream deflector 7 are designed in such a way that they blend into the side of the bodywork 1 of the hovercraft in arch form.

When taking a straight course (FIG. 2), the rudder elements 11, 12 are in their neutral position, where they each form a single surface with the respective deflector surface 9, 10. In this position, there is absolutely no deflection of the air blown out of the drawing engines 2, 3.

In order to take a left-hand curve course, for example (FIG. 3), the rudder elements 11, 12 are positioned in opposite directions to each other, i.e. rudder element 11 is moved upwards and rudder element 12 is moved downwards. Because the air jet of each engine is deflected to the left by the same amount, a left-hand curve course is taken. Because the rudder elements 11, 12 of the negative Vee stream deflector 7 are operated in opposite directions to each other, the air jet of the left-hand engine 9 is simultaneously deflected upwards and the air jet of the right-hand engine 10 is simultaneously deflected downwards. Thus, when taking a left-hand curve course, a moment of torsion occurs which tilts the hovercraft about the transverse axis in the direction of the inside of the curve, with the degree of tilt being dependent on the angle of incidence of the rudder elements 11, 12. This means that, the greater the angle of incidence selected for the rudder elements 11, 12, the greater the inclination of the hovercraft about the transverse axis, with the degree of tilt simultaneously depending on the speed of travel. FIG. 3 illustrates the composition of the parallelogram of forces, comprising a lateral force 13, an upward force 14 and a resultant force 15. Addition of the two resultant forces 15 yields a moment of torsion about the transverse axis of stability of the hovercraft.

Corresponding force conditions occur when taking a right-hand curve course (FIG. 4), i.e. the rudder elements 11, 12 are each set to the same angle of incidence in such a way that rudder element 11 is moved downwards and rudder element 12 is moved upwards. The result is an inclination of the hovercraft about the transverse axis, namely to the right in the direction of the inside of the curve.

This inclination towards the inside of the curve causes a reduction in size of the air gap between the bottom edge of the rubber skirt 4 and the ground or the surface of the water on this side, and an increase on the outside of the curve. An additional force component is thus produced in the direction of the inside of the curve, which reduces the drift of the hovercraft and, at the same time, markedly improves manoeuvrability at slow speeds.

The drawing between the engines 2, 3, which is covered by the protruding deflector 7, can, at the same time, be used for installing a cooling fan 16 for cooling a motor located within the bodywork 1.

REFERENCE NUMBERS

1 Bodywork
2 Engine
3 Engine
4 Rubber skirt
5 Back skirt
6 Finger skirt
7 Deflector
8 Stabilising nose
9 Deflector surface
10 Deflector surface
11 Rudder element
12 Rudder element
13 Lateral force
14 Upward force
15 Resultant force
16 Fan

We claim:

1. A combination of a steering device and a hovercraft having two driving engines (2, 3) for creating an air jet and driving the hovercraft, the driving engines (2, 3) arranged next to each other at a stern of the hovercraft, a back skirt (5) and a finger skirt (6) located below the hovercraft in which an air-cushion can be generated, and a jet deflection device located in the air jet downstream of the two driving engines (2, 3) in order to control the direction of travel, characterised in that the jet deflection device comprises a Vee stream deflector (7) with a negative Vee arrangement and rudder elements (11, 12) which can be operated in opposite directions, the Vee stream deflector (7) being arranged behind the driving engines (2, 3) in such a way that each driving engine (2, 3) is assigned a portion of the Vee stream deflector (7) having a rudder element (11; 12), which runs diagonally through an axis of symmetry of the respective driving engine (2, 3), and the Vee stream deflector (7) further includes a middle section which is designed as a stabilising nose (8).

2. The combination of claim 1, characterised in that when the hovercraft travels along a curved path and the air jet of the driving engine (2; 3) on the inside of the curved path can be deflected simultaneously in the direction of the curved path and in an upward direction.

3. The combination of claim 1, characterised in that when the hovercraft travels in a curved path and the air jet of the driving engine (2; 3) on the outside of the curved path can be deflected simultaneously in the direction of the curved path and in a downward direction.

4. The combination of claim 1, characterised in that the rudder elements (11; 12) extend across an entire diameter of the driving engines (2; 3).

5. The combination of claim 1, wherein the driving engines (2, 3) each include an exhaust diffuser at the rear thereof and wherein the Vee stream deflector (7) is fitted directly to the exhaust diffusors of the driving engines (2; 3).

6. The combination of claim 1, characterised in that the middle section of the Vee stream deflector (7) includes an edge-shaped roof portion which protrudes beyond a contour of the hovercraft.

7. The combination of claim 6, characterised in that a bottom edge of the Vee stream deflector (7) blends into a side of the hovercraft in arch form.

* * * * *